(12) United States Patent
Maness (10) Patent No.: US 6,814,535 B1
(45) Date of Patent: Nov. 9, 2004

(54) METHOD AND SYSTEM OF RELOCATING MATERIALS IN SHELF LIST ORDER

(76) Inventor: Cecil Eugene Maness, 7833 S. Peoga Rd., Trafalgar, IN (US) 46181

( * ) Notice: Subject to any disclaimer, the term of this patent is extended or adjusted under 35 U.S.C. 154(b) by 232 days.

(21) Appl. No.: 10/122,757

(22) Filed: Apr. 15, 2002

(51) Int. Cl.⁷ .................................................. A47F 5/00
(52) U.S. Cl. ....................................... 414/807; 414/810
(58) Field of Search ................................ 414/265, 277, 414/281, 286, 403, 787, 807, 809, 810

(56) References Cited

U.S. PATENT DOCUMENTS

| | | | |
|---|---|---|---|
| 2,309,723 A | | 2/1943 | Wilson |
| 3,637,095 A | * | 1/1972 | Kampfer ................ 414/331.07 |
| 3,654,548 A | | 4/1972 | Pecorari et al. |
| 3,756,439 A | | 9/1973 | Johnson |
| 3,854,152 A | | 12/1974 | Chez |
| 3,917,087 A | | 11/1975 | Godbersen |
| 4,034,864 A | * | 7/1977 | Tyson et al. ................... 211/50 |
| 4,262,804 A | | 4/1981 | Nelson, Jr. |
| 4,391,454 A | | 7/1983 | Marsh et al. |
| 4,397,606 A | * | 8/1983 | Bruton ......................... 414/800 |
| 4,478,156 A | | 10/1984 | Andersson |
| 4,781,515 A | | 11/1988 | Johnson |
| 4,787,104 A | | 11/1988 | Grantham |
| 4,824,050 A | | 4/1989 | Courter |
| 4,991,912 A | | 2/1991 | Fox |
| 5,292,010 A | * | 3/1994 | Pickles et al. ............ 211/41.12 |
| 5,690,463 A | * | 11/1997 | Yoshie ......................... 414/266 |
| 5,766,298 A | | 6/1998 | Ashley et al. |
| 5,779,428 A | | 7/1998 | Dyson et al. |
| 5,781,943 A | | 7/1998 | Moenning et al. |
| 5,846,043 A | | 12/1998 | Spath |
| 6,074,156 A | | 6/2000 | Frich |
| 6,203,262 B1 | | 3/2001 | Frich et al. |

* cited by examiner

Primary Examiner—Dean J. Kramer
Assistant Examiner—Charles A. Fox
(74) Attorney, Agent, or Firm—Brinks Hofer Gilson & Lione (57) ABSTRACT

A method and system of relocating materials in shelf list order includes at least one book caddie, at least one conveyor section and at least one cart. The conveyor sections may be detachably coupled to extend the length of a plurality of shelves containing a collection of materials in shelf list order. The book caddies may be placed on the conveyor sections and sequentially filled with materials such that shelf list order of the materials is maintained. The book caddies may then be conveyed along the conveyor to the carts. Groups of the book caddies may be arranged on the carts to maintain shelf list order of the materials. The carts may be relocated to a new location. At the new location, the conveyor sections may again be detachably coupled and the book caddies may be sequentially removed from the carts and conveyed along the conveyor sections. The book caddies may be adjacently positioned on shelves and the material slid out to recreate the collection in shelf list order at the new location.

24 Claims, 7 Drawing Sheets

METHOD AND SYSTEM OF RELOCATING MATERIALS IN SHELF LIST ORDER

FIELD OF THE INVENTION

The present invention relates generally to relocating materials and more particularly, to methods and systems for relocating materials while maintaining the materials in shelf list order.

BACKGROUND

Maintenance of materials in shelf list order within a collection is common practice to enable relatively efficient retrieval of such materials. A well known example involves books in a library. The books are typically maintained on shelves in a predetermined order according to unique call numbers attached to each book. Typically, books are placed in shelf list order by organizing the books according to call number from left to right across each shelf starting from the top shelf and proceeding down to the bottom shelf.

When such materials need to be relocated, the materials are typically manually moved and then shelved in the new location in shelf list order. If the materials are removed from the shelves without regard to shelf list order, arranging the materials in shelf list order in the new location is a significant and time consuming task. Even where efforts are made to maintain shelf list order of the materials during the relocation process, significant time is required to reassemble the collection in shelf list order. This is especially the case where the collection of materials is large enough to require splitting up the collection to complete the relocation.

During the relocation process, the materials are typically stored in uniquely marked boxes. When multiple boxes are independently relocated, finding and identifying the boxes as well as overcoming errors/confusion in the marking of the boxes may also be a time consuming and complex task. In addition, where the materials are large and/or heavy, such as, for example with books, maintaining shelf list order may be further complicated by the need to vary the amounts of materials in any one box. Further, materials within the boxes may be bent or damaged due to shifting of the materials and collision of the boxes with each other and with other objects during the relocation process.

Aside from the difficulties in maintaining shelf list order, the relocation of materials also requires significant manpower, physical strength and large amounts of time. Individually loading boxes with materials, moving the boxes from one location to another and unloading the boxes is an extremely time-consuming and manpower intensive task. In addition, repetitive stress injuries and other injuries related to lifting and bending may occur. Even where carts, dollies or some other wheeled devices are used to move the boxes of materials, significant amounts of lifting and bending occur. This is especially the case where materials are stored in areas that are not directly accessible with such carts or dollies and therefore boxes must be physically carried to an accessible location.

SUMMARY

The invention provides economic and efficient methods and systems for relocating materials in shelf list order. The methods and systems allow materials in any size collection to be relocated while maintaining the materials in shelf list order. With the methods and systems, significantly more materials may be moved with significantly less manpower in a significantly shorter period of time than with previously available systems and techniques. In addition, the systems and methods provide ergonomic benefits by reducing the amount of lifting, bending, reaching, pulling and pushing during the relocation process.

The system of relocating materials in shelf list order may include a plurality of book caddies, at least one conveyor section and at least one cart. The book caddies may be in the form of a triangular shaped tray formed to receive a plurality of materials. The conveyor sections may be detachably coupled in an end-to-end configuration to form a conveyor. The conveyor may be positioned to extend the length of one or more shelves containing a collection of materials that are to be relocated. In addition, the conveyor may extend beyond one end of the shelves to a predetermined location. The cart(s) may be positioned near the predetermined location.

During operation, each of the book caddies may be placed on the conveyor and sequentially filled with materials from the collection. The book caddies may be filled with materials in shelf list order to form each of a plurality of sub-collections. The book caddies with the materials stored therein may be conveyed sequentially along the conveyor to maintain the materials in shelf list order. Upon reaching the predetermined location, the book caddies may be sequentially transferred to a cart to form a group. The materials in the group are maintained in shelf list order on the cart. Each cart containing a group of book caddies may be uniquely identified and relocated to a new location.

At the new location, the conveyor sections may again be detachably coupled to form a conveyor extend the length of a plurality of shelves and beyond one end. The carts containing the groups of book caddies may be positioned near the conveyor extending beyond the end of the shelves. One of the uniquely identified carts may be positioned next to the conveyor. The group of book caddies on the cart may be sequentially removed from the group and placed on the conveyor to maintain shelf list order of the materials. The book caddies may be sequentially conveyed along the conveyor to a selected location among the shelves. At the selected location, the book caddies may be sequentially removed from the conveyor and placed adjacently on the shelves to recreate the collection in shelf list order. The materials within each of the book caddies may be slid out of a respective book caddie onto a respective shelf thereby recreating the collection in shelf list order on the shelves in the new location.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS

The presently preferred embodiments describe a method and system of relocating materials in shelf list order. The materials may be part of any size collection where materials are maintained in a shelf list order. The method and system allows simple, fast and efficient relocation of materials while maintaining the materials in shelf list order throughout the relocation process. In addition, the method and system allows the collection to be divided into any number of sub-collections without compromising shelf list order. Further, the materials may be quickly and efficiently re-assembled on shelves in shelf list order in the new location. Not only is the system of relocating materials in shelf list order ergonomically friendly, but also minimizes manpower needs and protects the materials from damage.

Figure 1:
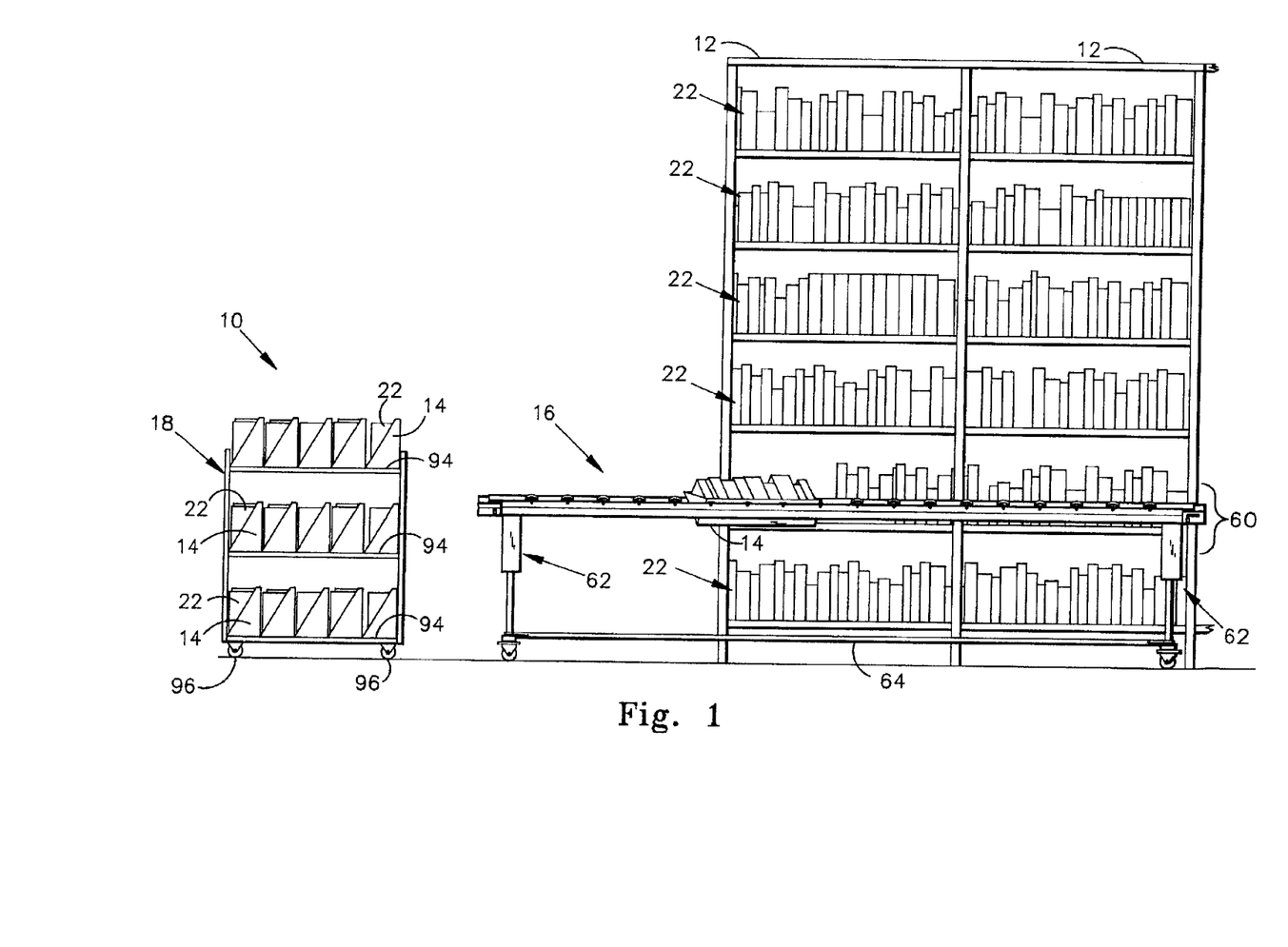
FIG. 1 is a perspective view of one embodiment of a material relocation system.

FIG. 1 illustrates one embodiment of a material relocation system 10 and a plurality of shelves 12. The material relocation system 10 includes a plurality of book caddies 14, at least one conveyor section 16 and at least one cart 18. The material relocation system 10 may relocate materials in shelf list order with a manual process, an automated process or a partially manual/partially automated process. The automated processes may be performed with, for example, robots, servomotors, hydraulics and/or any other mechanical device (s) capable of performing work.

The shelves 12 may be drawers, slots, platforms, steps, shoulders or any other structure capable of allowing access to materials 22 forming a collection. In the illustrated embodiment, the shelves 12 are bookshelves and the collection of materials 22 are a collection of books. In other embodiments, the materials 22 forming the collection may be records, files, samples, specimens and/or any other object (s) capable of being compiled into a collection and organized in shelf list order. Each of the materials 22 may be arranged in shelf list order and may include one or more independent objects.

As used herein, the term "shelf list order" refers to the physical arrangement of each of a plurality of materials 22 with respect to one another in a collection. Each of the materials 22 may also be independently identified with respect to the remaining materials 22 in the collection. An example of materials 22 maintained in shelf list order are books in a library where each book in the collection is identified with a unique call number. Identification of materials 22 may be based on numbers, letters, barcodes, colors, patterns or any other mechanism for differentiating between different materials. In addition, identification may or may not be uniquely assigned to each object and instead may represent a group of objects. Further, the collection of materials 22 may be arranged in shelf list order based on the identification, or may be arranged in any other configuration that logically provides access to the individual materials 22 within the collection.

The book caddies 14 may be any mechanism capable of supporting and protecting a sub-collection of the materials 22 within a collection. As used herein, a sub-collection is a subset of the collection of materials 22 in which the materials 22 within the subset are maintained in shelf list order. In the presently preferred embodiments, each of the book caddies 14 is a uniformly sized triangular shaped tray. The book caddies 14 provide a tray mechanism that not only maintains materials 22 in shelf list order, but also allow fast and efficient relocation of the materials 22. In addition, the book caddies 14 provide a transport mechanism specifically designed for use within the material relocation system 10 that also protects the materials 22 during relocation. Further, the book caddies 14 may be advantageously utilized to maximize the rate at which materials 22 may be relocated while minimizing the level of physical labor required.

Figure 2:
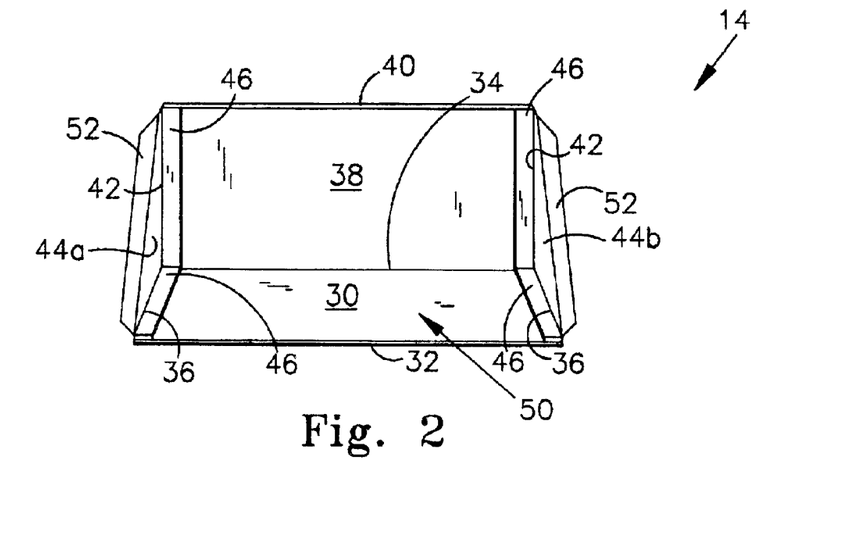
FIG. 2 is a perspective view of one embodiment of a book caddie included in the material relocation system illustrated in FIG. 1.

FIG. 2 is a perspective view of one embodiment of a book caddie 14 in the form of a triangular shaped tray. Each of the book caddies 14 may be formed from steel, aluminum, carbon fiber, plastic or any other rigid material. As illustrated in FIG. 2, the book caddie 14 includes a bottom plate 30 extending in a single plane to a front bottom edge 32, a back bottom edge 34, and first and second side bottom edges 36. The front bottom edge 32 is preferably rounded to increase rigidity and present a smooth edge without roughness that may cause damage, such as, for example, scratches and marring, to other objects, to the materials 22 and/or to individuals handling the book caddies 14. Extending generally perpendicular from the back bottom edge 34 is a rear plate 38. The rear plate 38 extends in a single plane to a top rear edge 40 and first and second side rear edges 42. The top rear edge 40 is preferably also rounded.

In the presently preferred embodiments, the book caddie 14 is formed of steel and the bottom and side plates 30, 38 are formed of a continuous steel sheet. The steel sheet may be bent at about a ninety-degree angle along the back bottom edge 34 to align the bottom plate 30 generally perpendicular with respect to the rear plate 38. The front bottom edge 32 and the top rear edge 40 of this embodiment are rolled to provide a rounded edge thereby avoiding damage and enhancing structural integrity. In other embodiments, the bottom plate 30 and the rear plate 38 may be separate sheets fixedly coupled by welding, gluing, corner brace(s), fasteners and/or any other mechanism for rigidly coupling the bottom plate 30 and the rear plate 38.

The book caddie 14 of the illustrated embodiment also includes first and second side plates 44 (identified as 44a and 44b, respectively) extending in respective planes generally perpendicular to the bottom plate 30. The side plates 44 are fixedly coupled with the side bottom edges 36 and the side rear edges 42 by, for example, welding, gluing, corner braces, fasteners (rivets, screws, etc.) and/or any other mechanism for rigidly coupling the side plates 44 to both the bottom plate 30 and the rear plate 38. In the presently preferred embodiments, first and second side plates 44 include a coupling lip 46 formed to lie generally parallel and in contact with the bottom plate 30 and the rear plate 38. The coupling lip 46 is preferably welded to the bottom plate 30 and the rear plate 38.

The combination of the bottom plate 30, the rear plate 38 and the side plates 44 form a partially enclosed tray 50 in which a sub-collection of a collection of materials 22 may be stored as best illustrated in FIG. 1. The materials 22 may be positioned in the partially enclosed tray 50 in the same order that the materials 22 were previously stored in the shelves 12. In one embodiment, where the materials 22 are books, the books are preferably placed on edge with the lower edge of each book in close proximity to the bottom plate 30 and the spine of each book in close proximity to the rear plate 38. In this embodiment, the book caddie 14 may be filled with adjacently positioned books until the rear cover of one book is contacting the first side plate 44a and the front cover of another book is contacting the second side plate 44b. In alternative embodiments, the books of this embodiment may be adjacently oriented with the spine of each book opposite the rear plate 38, or any other orientation.

Figure 3:
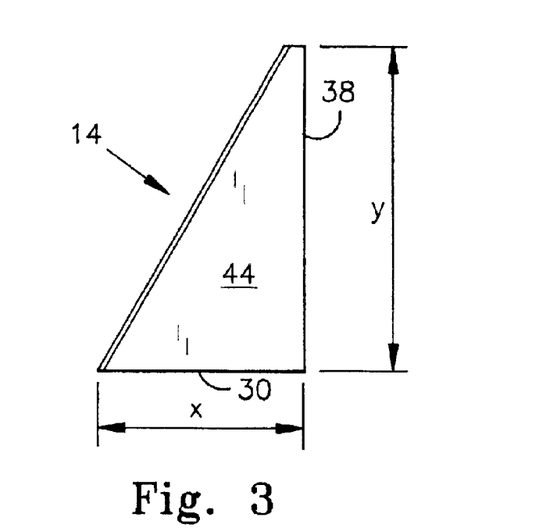
FIG. 3 is a side view of one embodiment of the book caddie illustrated in FIG. 2.

FIG. 3 is a side view of one embodiment of the book caddie 14 illustrated in FIG. 2. As illustrated, the side plates 44 of these embodiments may be continuous triangularly shaped sheets to maintain the generally perpendicular relationship between the bottom sheet 30 and the rear sheet 38. In other embodiments, the side plates 44 may be struts, webbing or any other mechanism capable of providing structural support and helping to maintain materials 22 in the book caddie 14. In still other embodiments, the side plates 44 may provide little structural support while still helping to maintain materials 22 within the book caddie 14.

As further illustrated in FIG. 3, length (x) of the bottom plate 30 is preferably less than length (y) of the rear plate 38 to protect the materials 22 from damage during relocation. Protection of the materials 22 may be provided when the book caddies 14 are relocated in an upright position with the bottom plate 30 contacting another surface as well as when the book caddies 14 are, for example, slid down a ramp or other similar structure on the rear plate 38. As described later, the combination of the bottom and rear plates 30, 38 also protect the materials 22 when the book caddies 14 are conveyed. In one embodiment, length (x) is about 75% of length (y). In other embodiments, the bottom and rear plates 30, 38 may be any length with respect to each other, such as, for example, equal lengths.

Figure 4:
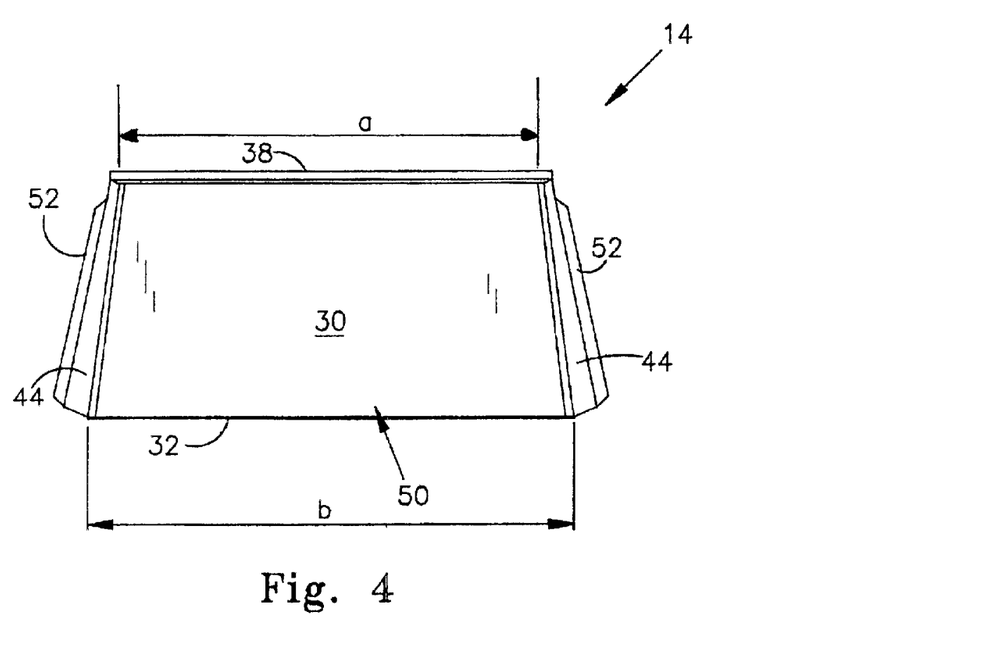
FIG. 4 is a top view of one embodiment of the book caddie illustrated in FIG. 2.

FIG. 4 is a top view of one embodiment of the book caddie 14 illustrated in FIG. 2. In this embodiment, the portion of the bottom plate 30 adjacent the rear plate 38 may extend between the side plates 44 to equal length (a). The front edge 32 of the bottom plate 30, however, may extend between the side plates 44 to equal length (b). Length (a) is preferably less than length (b). As such, the side plates 44 do not extend generally perpendicular from the rear plate 38. Instead, the side plates 44 may taper inwardly between the front bottom edge 32 and the rear plate 38 such that the partially enclosed tray 50 may become gradually narrower towards the rear plate 38. In the presently preferred embodiments, length (a) is about 4% less than length (b).

When a book caddie 14 is filled with a sub-collection of materials 22, the materials 22 may be effectively held in the book caddie 14 with friction fit due to the gradual narrowing of the partially enclosed tray 50. The tapered configuration of the partially enclosed tray 50 also provides another advantage in terms of storage of the book caddies 14 during non-use. The rear plate 38 of one book caddie 14 may be placed inside the partially enclosed tray 50 of another book caddie 14 due to the tapered configuration. As such, the book caddies 14 may be stored in a stacked arrangement to minimize consumption of storage space.

As best illustrated in FIGS. 2 and 4, the side plates 44 may also include handles 52. In the presently preferred embodiments, the handles 52 are flanges formed along a top edge of the side plates 44 and extending generally perpendicular away from the side plates 44. Similar to the front bottom edge 32 and the top rear edge 40, the handles 52 are also rounded for structural integrity and to avoid sharp edges. In other embodiments, fingers, shoulders, rings, apertures or any other mechanism providing the capability to grasp and move the book caddies 14 may be utilized.

Referring again to FIG. 1, the book caddies 14 preferably include sufficient capacity in the partially enclosed tray 50 to hold a predetermined sized sub-collection of the materials 22 that may be arranged in shelf list order on a single shelf within the shelves 12. In addition, the book caddies 14 may be sized such that one or more book caddies 14 (depending on the size of the shelf) may be placed adjacently on a shelf. In one embodiment, a shelf full of materials 22 may be stored in shelf list order in two book caddies 14 for purposes of relocation. In this embodiment, the book caddies 14 are advantageously sized to match the length of the shelf. When the book caddies 14 are placed adjacently on the shelf, the materials 22 stored therein are in shelf list order and fill the entire shelf.

Upon reaching a new location, the book caddies 14 may be placed adjacently on a shelf such that the sub-collection of materials 22 stored therein are again in shelf list order. Accordingly, each of the book caddies 14 may be tipped such that the materials 22 slide out of the book caddie 14 onto the shelf in shelf list order. The book caddies 14 may include a surface treatment providing a low friction surface to allow materials 22 to readily slide out of the book caddies 14 when tipped. In one embodiment, the surface treatment is powder coat paint. In other embodiments, the surface treatment may be polished surfaces, a Teflon™ coating, a plastic coating or any other surface conditioning mechanism capable of providing low friction.

The conveyor sections 16 of FIG. 1 may be any mechanism capable of supporting and conveying the book caddies 14. In the illustrated embodiment, one conveyor section 16 is depicted as a single straight section at a uniform height positioned next to the shelf 12 and supporting one of the book caddies 14. In other embodiments, multiple conveyor sections 16 may be utilized to support and convey any number of book caddies 14. In addition, the conveyor section 16 may be curved and/or may include variable heights in other embodiments. In the presently preferred embodiments, the conveyor sections 16 are formed to fit within aisles between adjacent shelves 12 while still allowing room to remove materials 22 and fill the book caddies 14. In addition, the height of conveyors 16 of this embodiment allow placing of book caddies 14 thereon without excessive bending, stooping and/or reaching to maintain an ergonomically friendly system.

Each of the conveyor sections 16 includes a conveyor 60, a plurality of carriage supports 62 and a carriage strut 64. The longitudinally extending conveyor 60 may support book caddies 14 placed thereon and allow the book caddies 14 to be conveyed longitudinally with low friction along the conveyor 60. The carriage supports 62 are fixedly coupled to the conveyor 60 and longitudinally extend away to maintain the conveyor 60 at a predetermined height. In addition, each of the carriage supports 62 provides mobility to the conveyor sections 16. The carriage strut 64 is fixedly connected to each of the carriage supports 62 to rigidly maintain the carriage supports 62 generally perpendicular with respect to the conveyor 60. Although two carriage supports 62 and one carriage strut 64 are illustrated, in other embodiments, any number of carriage supports 62 and/or carriage struts 64 may be included in a conveyor section 16.

Figure 5:
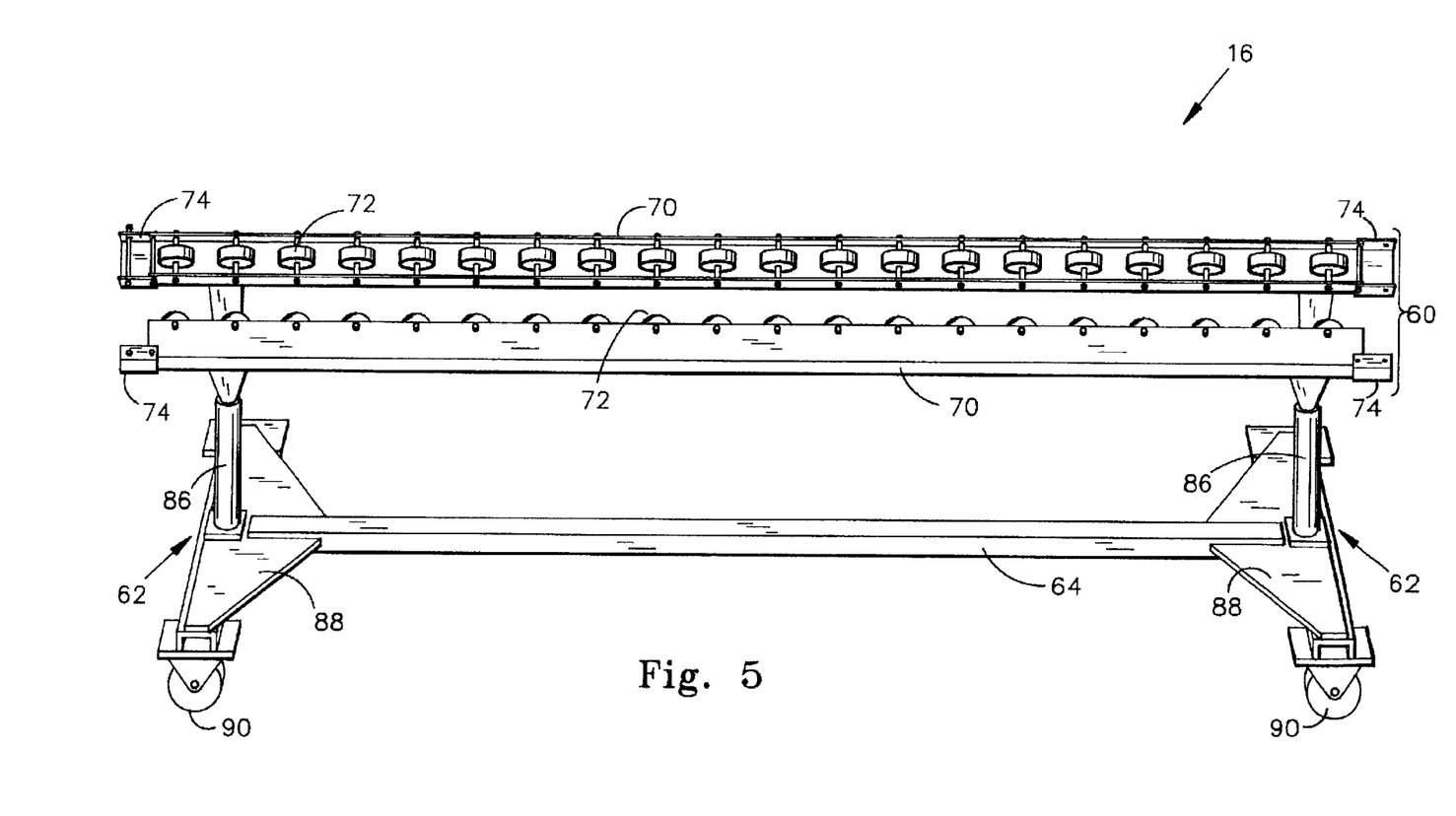
FIG. 5 is a perspective view of one embodiment of a conveyor section included in the material relocation system illustrated in FIG. 1.

FIG. 5 is a perspective view of one embodiment of a conveyor section 16. As in FIG. 1, the conveyor section 16 includes the conveyor 60, the carriage supports 62 and the carriage strut 64. In the illustrated embodiment, the conveyor 60 includes a first and second channel 70 with a plurality of rollers 72 rotatably mounted on each of the channels 70. In the presently preferred embodiments, the channels are "u-shaped" and the rollers 72 are maintained within the "u-shape" of the channels 70 by spindles coupled with opposite sides of the channels 70. In other embodiments, any other form of channels and coupling mechanisms may be used to rotatable couple the rollers 72 to the channels 70.

Each of the channels 70 may also include a coupling mechanism 74 fixedly coupled at each end of the channels 70. The coupling mechanisms 74 may allow rigid detachable coupling of individual conveyor sections 16 to form a continuous conveyor 60 of any desired length. The coupling mechanism 74 may be, for example, a latch mechanism, a pin connection, a snap-fit connection, bolted connection, or any other form of detachable coupling mechanism. In the illustrated embodiment, the coupling mechanism 74 is formed to align with the coupling mechanism 74 of an adjacently positioned conveyor section 16 such that apertures therein may be aligned and the coupling mechanisms 74 may be detachably coupled with a pin. Each of the channels 70 are also fixedly coupled with the each of the carriage supports 62.

Figure 6:
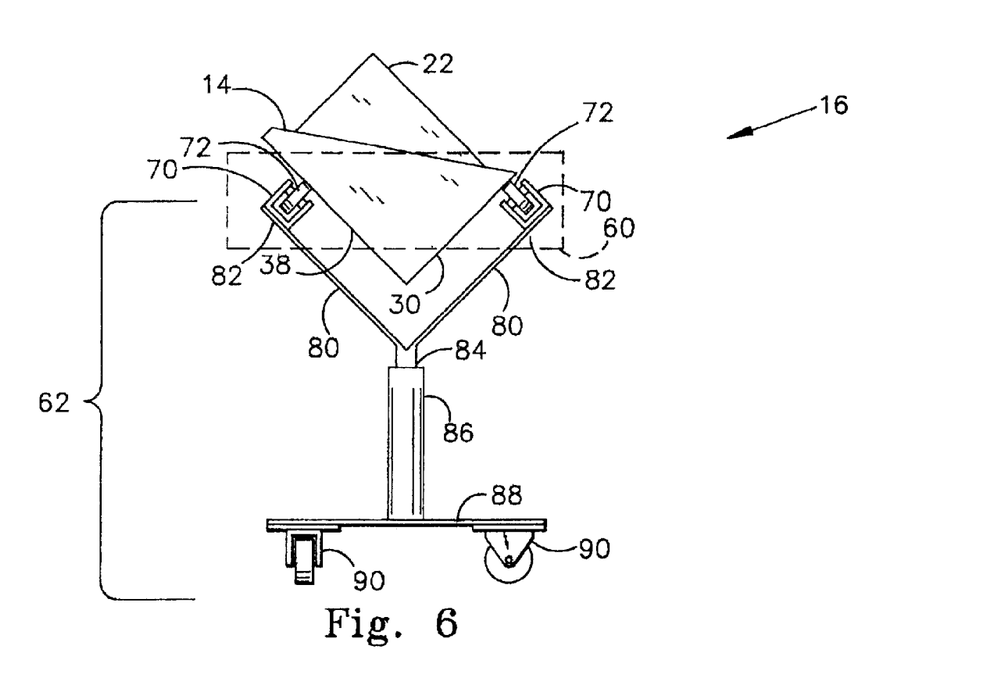
FIG. 6 is a side view of one embodiment of the conveyor section illustrated in FIG. 5.

FIG. 6 is an elevation view of one end of the conveyor section 16 that also includes a book caddie 14. The carriage supports 62 of the illustrated embodiment include first and second cantilevered trusses 80 that are fixedly coupled at a first end 82 to the channels 70 and at a second end 84 to a column 86. The trusses 80 are preferably formed of steel but may, in other embodiments, be formed of any other rigid material capable of rigidly maintaining the position of the channels 70. The channels may be coupled to the trusses by welding, rivets, fasteners and/or any other mechanism for rigidly coupling the channels to with the trusses 80.

At the second end 84, the trusses 80 come together and are formed to fixedly couple with the column 86. The coupling of the trusses 80 to the column 86 of one embodiment may be, for example, by welding, gluing, threaded connection, fasteners, etc. In another embodiment, the coupling may be slidable to allow for vertical height adjustment of the trusses 80, such as, for example, by selectively inserting a pin through apertures in both the second end 84 of the trusses 80 and the column 86. The column 86 is preferably also made of steel or some other rigid material.

Referring now to FIGS. 5 and 6, the column 86 may be fixedly connected to a base 88. The base 88 may be a flat plate as illustrated extending generally perpendicular away from the column 86. Coupling of the column 86 and the base 88 may be by welding, fasteners, such as, for example, nuts and bolts and/or any other mechanism capable of forming a rigid connection. Also fixedly coupled with the base 88 are the carriage strut 64 and a plurality of wheels 90 as illustrated. The wheels 90 may provide mobility to each of the conveyor sections 16. In the presently preferred embodiments, the wheels 90 are swiveling casters capable of being steered in any direction. In other embodiments, a set of rigid supports (not shown) may extend longitudinally between the trusses 80 and the base 88 to further support the trusses 80 in maintaining the position of the channels 70.

As further illustrated in FIG. 6, a book caddie 14 may be positioned on the conveyor 60 as illustrated. The book caddie 14 may be positioned such that the rollers 72 of one channel 70 are resting against and support the rear plate 38. In addition, the rollers 72 of the other channel 70 are resting against and support the bottom plate 30. Accordingly, the materials 22 within the book caddie 14 are protectively maintained within the book caddie 14 and the book caddie 14 may be conveyed along the conveyor 60. Further, the orientation of the book caddies 14 on the conveyor 60 allows the book caddies 14 to be efficiently loaded with materials 22 without excessive bending or stooping since the partially enclosed tray 50 (FIG. 2) is advantageously presented. Due to the orientation of the book caddie 14 on the conveyor 60, the materials 22 are maintained in the book caddie 14 by not only the previously discussed friction fit, but also, by gravity.

Referring once again to FIG. 1, the cart 18 may be any mobile device capable of accommodating a group of the book caddies 14. The cart 18 includes a plurality of platforms 94 formed to accept a plurality of book caddies 14 containing materials 22. In the presently preferred embodiments, the platforms 94 are each equipped with a non-skid surface and an end rail at each end (not shown) to maintain the book caddies 14 on the platforms 94 during relocation. In other embodiments, other mechanisms may be utilized to maintain the book caddies 14 on the platforms, such as, for example, a lip surrounding each of the platforms 94, removable side rails, keepers, latches or any other mechanism to maintain the book caddies 14 on the platforms 94.

The platforms 94 are formed such that the book caddies 14 may be placed with the bottom plate 30 (FIG. 2) resting on one of the platforms 94. Subsequent book caddies 14 may be placed adjacently such that the rear plate 38 (FIG. 2) is positioned adjacent to the front edge 32 (FIG. 2) of the subsequently placed book caddie 14 as illustrated in FIG. 1. Accordingly, materials may be maintained in the book caddies 14 by the rear plate 38 of the adjacently positioned book caddie 14. In the presently preferred embodiments, the platforms 94 are each formed to maximize the number of the book caddies 14 placed in a single file row thereon. By advantageously arranging the book caddies 14 on the platforms 94, substantially greater quantities of materials 22 may be transported on a single cart 18 than would otherwise be possible.

The illustrated cart 18 also includes a plurality of wheels 96 to allow mobility of the cart 18. In the presently preferred embodiments, the wheels 96 at one end of the cart are swivel casters and the wheels 96 at the other end of the cart 18 are fixed casters. Accordingly, the cart 18 may be directed to any desired location. In other embodiments, any other form of conveyance capable of transporting the book caddies 14 may be utilized.

Figure 7:
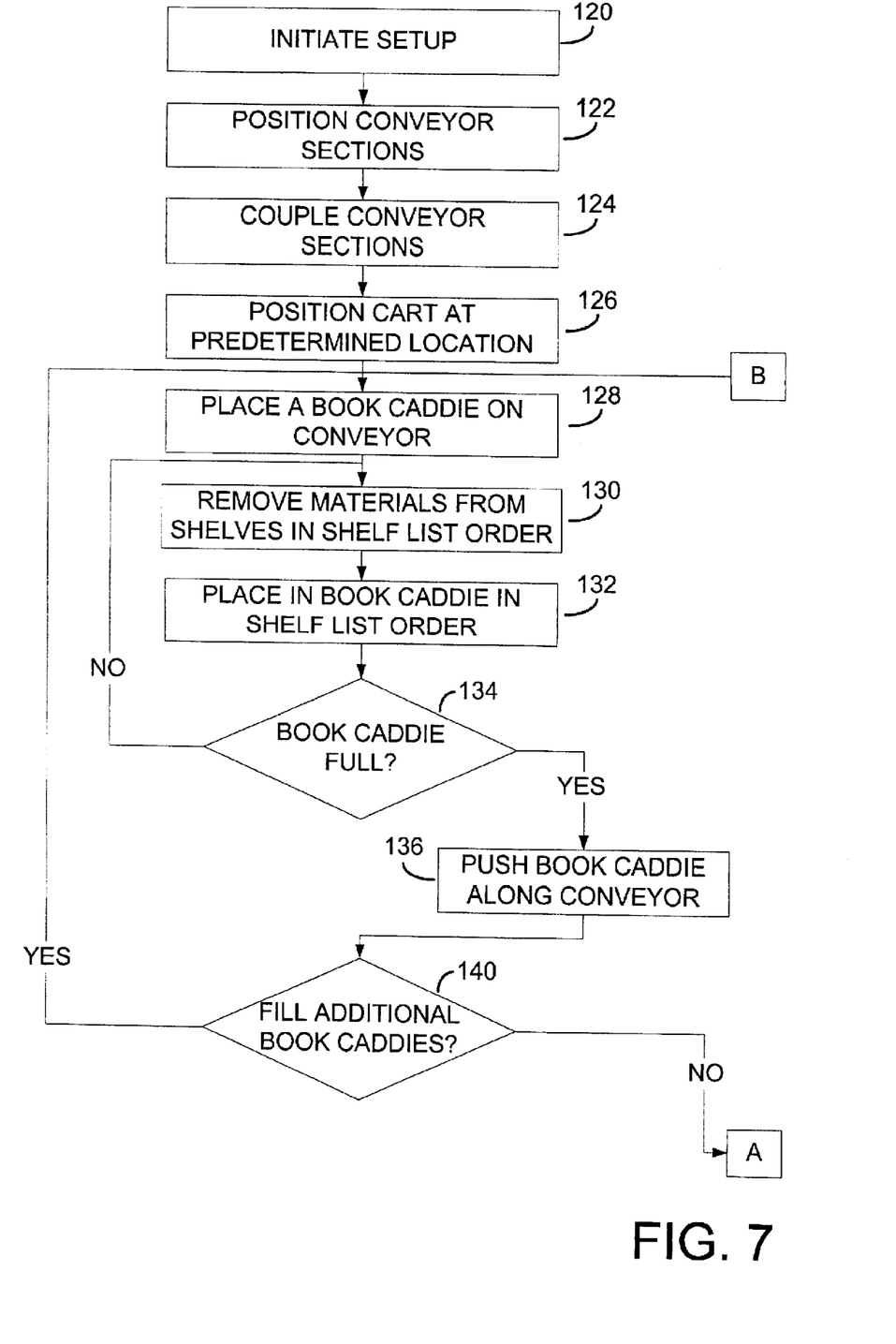
FIG. 7 is a flow diagram illustrating operation of the material relocation system depicted in FIG. 1.

FIG. 7 is a flow diagram illustrating exemplary operation of the material relocation system 10 depicted in FIGS. 1–6. In this example, a collection of materials 22 located on shelves 12 is to be relocated to other shelves 12 in a different location. As should be readily understood, in other example operations, variations in the relocation process may occur depending on the configuration of the materials 22, the type of relocation desired or any other collection specific requirements. For example, only a portion of the collection of materials 22 may be relocated, the materials 22 may be moved and then replaced on the same shelves 12 and/or any other situation specific requirements.

The operation begins at block 120 where setup of the material relocation system 10 is initiated. At block 122, one or more conveyor sections 16 are wheeled into position adjacent the shelves 12 such that the conveyor sections 16 may extend the length of the shelves 12 to a predetermined location beyond one end of the shelves 12. Where multiple conveyors 16 are utilized, the conveyor sections 16 may be coupled end-to-end to form a continuous conveyor 60 at block 124. At block 126, the cart 18 is positioned at the predetermined location.

A selected one of the book caddies 14 may be placed on the conveyor 16 at block 128. At block 130, starting at an identified location within the collection, such as, for example, the beginning of the collection, the materials 22 may be removed from the shelves 12 in shelf list order. The materials 22 may be placed in the selected book caddie 14 in shelf list order at block 132. At block 134, a determination is made whether the book caddie 14 is full. If not, the operation returns to blocks 130 and 132 where additional materials 22 are removed from the shelves 12 and placed in the book caddie 14 in shelf list order.

If the book caddie 14 is full, the book caddie 14 may be pushed along the conveyor 60 at block 136. The determination of whether additional book caddies 14 should be sequentially filled with materials 22 occurs at block 140. If yes, the operation returns to block 128 and another book caddie 14 is selected, placed in sequential order after the previously filled book caddie 14 on the conveyor 60 and filled with materials 22.

Figure 8:
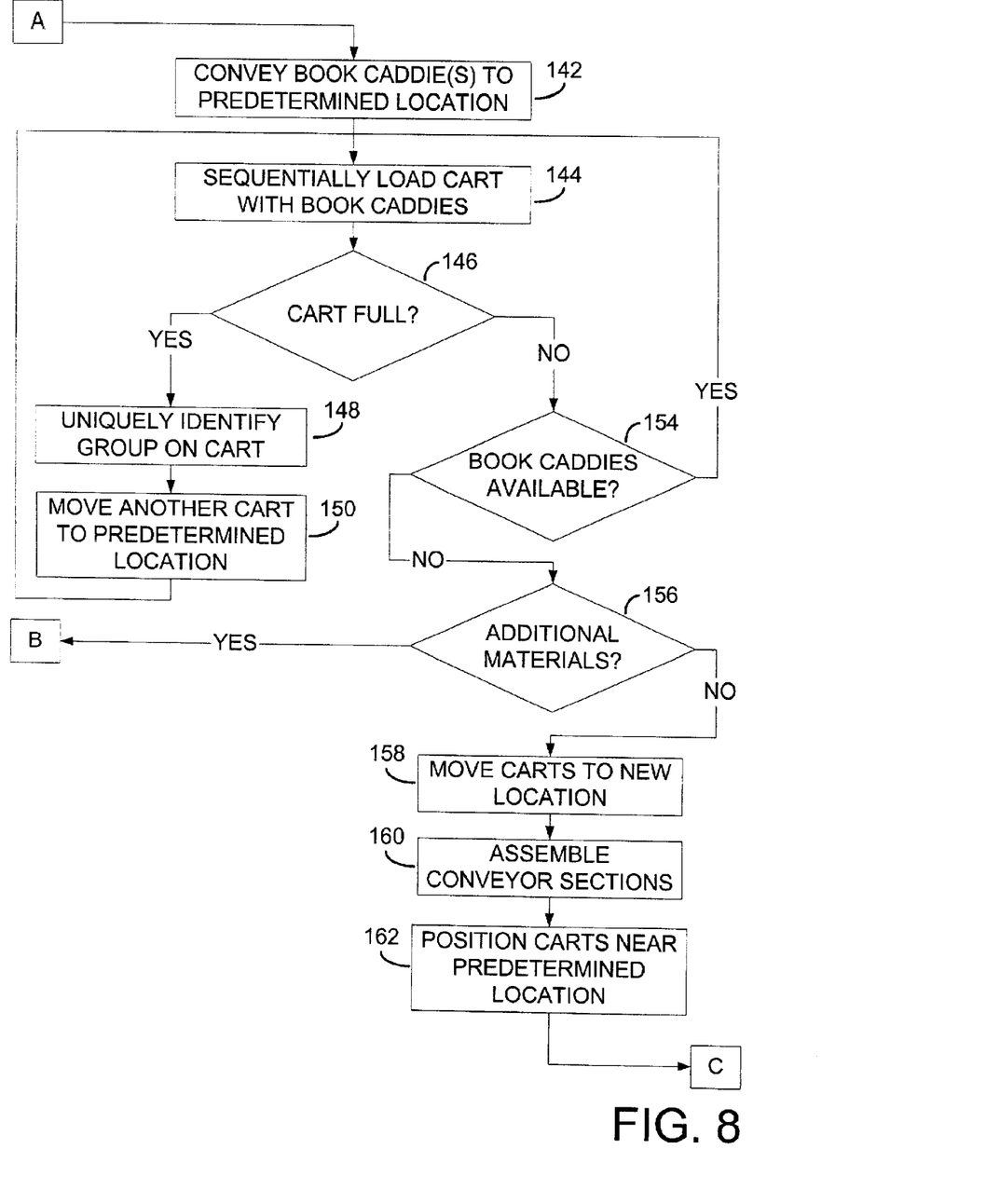
FIG. 8 is second portion of the flow diagram illustrated in FIG. 7.

Referring now to FIG. 8, if no additional book caddies 14 should be filled, the book caddie(s) 14 on the conveyor 60 may be sequentially conveyed to the predetermined location at block 142. At block 144, the book caddies 14 may be sequentially removed from the conveyor 60 to maintain the materials in shelf list order and placed on the platforms 94 of the cart 18 to form a group. At block 146, it is determined whether the cart 18 is full. If yes, the group of book caddies 14 on the cart 18 is uniquely identified at block 148. Unique identification may be, for example, numerical order, alphabetical order, or any other identification system for uniquely identifying each cart 18 in sequential order to maintain shelf list order of each of the groups of materials 22. At block 150, another cart 18 is moved to the predetermined location and the operation returns to block 144 to load the cart 18 with another group of book caddies 14.

If the cart 18 is not full at block 146, it is determined if additional book caddies 14 loaded with materials 22 are on the conveyor 60 at block 154. If additional book caddies 14 are present, the operation returns to block 144 to load additional book caddies 14 on the cart 18. If no book caddies 14 are on the conveyor 60, it is determined if there is additional materials 22 on the shelves 12 that need to be relocated at block 156. If yes, the operation returns to block 128 to prepare, convey and load additional book caddies 14. If there are no additional materials 22, the carts 18 are moved to a new location at block 158. At block 160, the conveyor sections 16 are wheel into position and coupled together to assemble the conveyor 60 in the new location to extend from a predetermined location along the length of a plurality of shelves 12. The carts 18 are positioned near the predetermined location at block 162.

Figure 9:
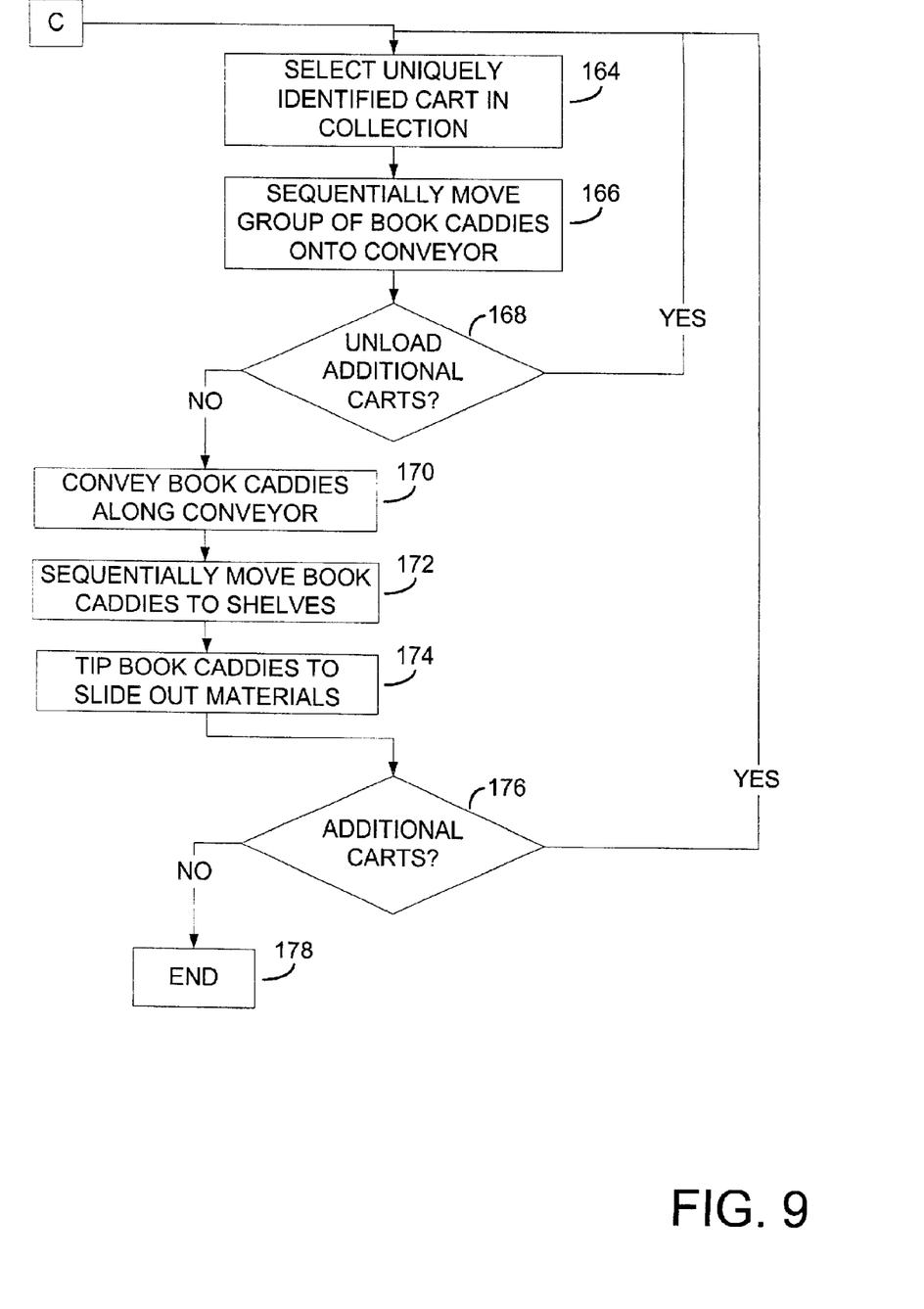
FIG. 9 is a third portion of the flow diagram illustrated in FIG. 7.

Referring now to FIG. 9, at block 164, a uniquely identified cart 18, such as, for example, the first cart 18 in the collection of materials 22 is selected and positioned adjacent the conveyor 60 in the predetermined location. The group of book caddies 14 thereon are sequentially removed and placed on the conveyor 60 to maintain shelf list order until the cart 18 is empty at block 166. At block 168, it is determined whether additional carts 18 should be unloaded. If yes, the operation returns to block 164 and the next uniquely identified cart 18 is selected and the group of book caddies 14 thereon are sequentially unloaded onto the conveyor 60.

If no additional carts 18 should be unloaded, the book caddies 14 are conveyed along the conveyor 60 to a selected location within the shelves 12 at block 170. The location in the shelves 12 is selected such that the materials 22 will once again be in shelf list order within the collection when placed on the shelves 12. At block 172, the book caddies 14 may be moved from the cart 18 to the shelves 12. The book caddies 14 may be positioned adjacently on the shelves 12 such that the materials 22 are maintained in shelf list order.

Each of the book caddies 14 may be individually tipped to slide the materials 22 located therein out onto the shelves 12 at block 174. Accordingly, the materials 22 are efficiently and quickly relocated and positioned on the shelves 12 in the same shelf list order as on the shelves 12 in the previous location. At block 176, it is determined if additional carts 18 containing book caddies 14 should be unloaded. If yes, the operation returns to block 164 to select the next uniquely identified cart 18 to maintain shelf list order. If there are no more carts 18 to unload, the operation ends at block 178.

In other embodiments, the relocation process may be performed using only the book caddies 14 and the conveyor section(s) 16. In still other embodiments, the relocation may occur using only the book caddies 14 and the cart(s) 18. In still further embodiments, the relocation may involve the use of only the book caddies 14.

The previously discussed embodiments of the material relocation system 10 provide an efficient and cost effective way to minimize manpower requirements while maximizing the amount of materials 22 that may be relocated. By utilizing the material relocation system 10, physical labor may be reduced with an ergonomically friendly system for relocating materials 22 contained in a collection. In addition, using the book caddies 14, materials 22 may be contained in sub-collections that are protected from damage during the relocation process. The sub-collections of materials 22 may be stored in the book caddies 14 in a configuration that allows relatively easy restoration to one collection as well as maximizing space during the relocation process. Not only does the material relocation system 10 provide efficient and cost effective relocation but also maintains materials 22 in shelf list order throughout the process.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of relocating a collection of materials in shelf list order, the method comprising:
  a) providing a plurality of book caddies each comprising a trianglar shaped tray formed to receive a plurality of materials;
  b) filling each of the book caddies with materials in shelf list order from a collection;
  c) relocating the book caddies;
  d) adjacently placing the book caddies on each of a plurality of shelves such that the materials are in shelf list order and form the collection; and
  e) tipping each of the book caddies to slide the materials out of a respective book caddie onto a respective shelf.

2. The method of claim 1, wherein b) comprises maintaining the materials in each of the book caddies by friction fit.

3. The method of claim 1, wherein c) comprises conveying the book caddies sequentially to a predetermined location.

4. The method of claim 1, wherein c) comprises arranging the book caddies in at least one group in order to maintain the materials in shelf list order.

5. The method of claim 1, wherein d) comprises placing at least two book caddies side-by-side on a shelf.

6. The method of claim 1, wherein each of the book caddies comprises a partially enclosed tray.

7. A method of relocating a collection of materials in shelf list order, the method comprising:
- a) removing a plurality of materials from a collection, the materials maintained in shelf list order within the collection;
- b) storing the materials in shelf list order in each of a plurality of triangular shaped trays to form a plurality of sub-collections;
- c) sequentially conveying each of the trays to a predetermined location, by pushing each of the trays along a conveyor;
- d) arranging the trays to form at least one group at the predetermined location, the trays arranged to relocate the materials within the at least one group in shelf list order;
- e) sequentially removing each of the trays from the at least one group;
- f) positioning each of the trays on one of a plurality of shelves to recreate the collection in shelf list order; and
- g) sliding the materials out of the trays onto the shelves.

8. The method of claim 7, wherein a) comprises removing books from a bookshelf.

9. The method of claim 7, wherein b) comprises supporting a bottom plate and a rear plate of each of the trays with a conveyor.

10. The method of claim 7, wherein d) comprises uniquely identifying the group.

11. The method of claim 7, wherein d) comprises positioning the trays in single file on a cart.

12. The method of claim 7, wherein e) comprises conveying each of the book caddies sequentially along a conveyor.

13. A method of relocating a collection of materials in shelf list order, the method comprising:
- a) providing a plurality of shelves, the shelves comprising a collection of materials in shelf list order;
- b) detachably coupling a plurality of conveyor sections in an end-to-end configuration adjacent the shelves, the end-to-end configuration extending the length of the shelves to a plurality of carts positioned at one end of the shelves;
- c) sequentially filling each of a plurality of book caddies with the materials in shelf list order;
- d) moving the book caddies in sequential order along the conveyor sections to the carts; and
- e) transferring the book caddies to the carts sequentially to maintain shelf list order.

14. The method of claim 13, further comprising repeating b); sequentially moving the book caddies from the carts to the conveyor sections; moving the book caddies sequentially along the conveyor sections; placing each of the book caddies on the shelves in order to maintain the materials in the book caddies in shelf list order; and sliding the materials out of a respective book caddie onto a respective shelf.

15. The method of claim 13, further comprising wheeling the conveyor sections to the new location.

16. The method of claim 13, wherein c) comprises placing each of the book caddies on the conveyor sections such that rollers on the conveyor sections support a bottom plate and a rear plate of each of the book caddies.

17. The method of claim 13, wherein e) comprises placing the book caddies on a platform of each of the carts such that a rear plate of one book caddie maintains materials in an adjacently placed book caddie.

18. A method of relocating a collection of materials in shelf list order, the method comprising:
- providing a collection of materials in shelf list order;
- storing the materials in shelf list order in each of a plurality of trays;
- conveying each of the trays along a conveyor to a predetermined location;
- arranging the trays to form at least one group at the predetermined location,
- wherein the trays are arranged to provide for relocation of the materials within the at least one group in shelf list order;
- sequentially removing each of the trays from the at least one group; and
- positioning each of the trays on a structure that allows access to the materials, wherein the trays are positioned on the structure to recreate the collection in shelf list order.

19. The method of claim 18, wherein conveying each of the trays along the conveyor comprises the initial act of assembling the conveyor by placement of a plurality of conveyor sections in an end-to-end configuration.

20. The method of claim 18, wherein arranging the trays comprises placing the trays on a mobile device configured to accommodate the trays.

21. The method of claim 18 wherein conveying each of the trays comprises placing each of the trays on the conveyor so that a plurality of rollers on the conveyor support each of the trays.

22. The method of claim 18 further comprising after each of the trays are positioned on the structure, tipping each of the trays to slid the materials out onto the structure.

23. The method of claim 18 wherein positioning each of the trays on the structure comprises arranging the trays on a plurality of shelves so that the materials are in shelf list order.

24. The method of claim 18 wherein each of the trays include tapered sides and storing the materials in shelf list order in each of the trays comprises placing a sufficient amount of materials in a tray so that the materials are held by friction fit in the tray between the tapered sides.

* * * * *